US009976280B2

(12) United States Patent
Honermann

(10) Patent No.: US 9,976,280 B2
(45) Date of Patent: May 22, 2018

(54) SKID LOADER ATTACHMENT INCLUDING A ROTATABLE AND EXTENDABLE CLAW

(71) Applicant: Michael A. Honermann, Mitchell, SD (US)

(72) Inventor: Michael A. Honermann, Mitchell, SD (US)

( * ) Notice: Subject to any disclaimer, the term of this patent is extended or adjusted under 35 U.S.C. 154(b) by 0 days. days.

(21) Appl. No.: 14/597,893

(22) Filed: Jan. 15, 2015

(65) Prior Publication Data

US 2015/0197916 A1 Jul. 16, 2015

Related U.S. Application Data

(60) Provisional application No. 61/928,264, filed on Jan. 16, 2014.

(51) Int. Cl.

| | |
|---|---|
| ***E02F 3/96*** | (2006.01) |
| ***E02F 3/413*** | (2006.01) |
| ***E02F 3/36*** | (2006.01) |
| ***B66C 23/44*** | (2006.01) |
| ***B66F 9/065*** | (2006.01) |
| *A01G 23/091* | (2006.01) |

(52) U.S. Cl.

CPC .............. *E02F 3/966* (2013.01); *B66C 23/44* (2013.01); *B66F 9/065* (2013.01); *E02F 3/3681* (2013.01); *E02F 3/4135* (2013.01); *E02F 3/962* (2013.01); *A01G 23/091* (2013.01)

(58) Field of Classification Search

CPC ......... E02F 3/404; E02F 3/962; E02F 3/3681; E02F 3/965; E02F 3/966; E02F 3/4135; B66C 23/44; B66F 9/065; A01G 23/091

USPC ......... 37/403, 404, 405, 406, 407, 408, 409, 37/410

See application file for complete search history.

(56) References Cited

U.S. PATENT DOCUMENTS

| | | | | | |
|---|---|---|---|---|---|
| 4,009,529 | A | * | 3/1977 | Johnson | E02F 3/962 172/719 |
| 4,200,423 | A | | 4/1980 | Somsin | |
| RE30,769 | E | * | 10/1981 | Cobb | E02F 3/32 173/193 |
| 4,863,338 | A | * | 9/1989 | Johnson | E02F 3/404 414/704 |
| 5,114,299 | A | * | 5/1992 | Roche | E02F 3/404 37/403 |

(Continued)

FOREIGN PATENT DOCUMENTS

| | | |
|---|---|---|
| JP | 2000096839 | 4/2000 |

OTHER PUBLICATIONS

PCT/US2015/011599, Written Opinion of the International Searching Authority, dated Jul. 19, 2016, 11 pages.

*Primary Examiner* — Jamie L McGowan

(74) *Attorney, Agent, or Firm* — Cesari & Reed, LLP; R. Michael Reed

(57) ABSTRACT

An attachment for a skid loader includes a base configured to attached to a loader arm of the skid loader, a rotatable coupling attached to the base on a side opposite the loader arm, and a claw portion attached to the rotatable coupling. The claw portion includes a stationary jaw and a pivoting jaw. The pivoting jaw pivotable with respect to the stationary jaw about a pivot rod. The pivoting jaw is coupled to the rotatable coupling via a hydraulic cylinder such that movement of the pivoting jaw about the pivoting rod is effected by actuation of the hydraulic cylinder.

18 Claims, 15 Drawing Sheets

15
14
10
16
19
19
12
18
17

(56) References Cited

U.S. PATENT DOCUMENTS 5,472,308 A * 12/1995 Somero .................. E02F 3/963 37/406
5,486,084 A 1/1996 Pitman et al.
5,590,482 A * 1/1997 Peterson ................ E02F 3/404 141/108
5,596,824 A * 1/1997 Scott .................... E02F 3/3681 37/403
5,607,251 A * 3/1997 Rafn .................... E02F 3/3609 37/406
5,621,987 A * 4/1997 Pratt .................... E02F 3/3618 172/272
5,868,211 A * 2/1999 Bohn ..................... E21B 7/028 173/27
5,938,399 A * 8/1999 Knutson .............. E02F 3/3609 37/468
6,098,320 A * 8/2000 Wass ..................... A01D 87/00 37/406
6,308,440 B1 10/2001 Mueller
6,357,993 B1 3/2002 Burton
6,360,459 B1 * 3/2002 Brookhart .............. E02F 3/345 172/825
6,370,801 B1 * 4/2002 Weyer .................... E02F 3/964 37/406
6,457,761 B1 10/2002 Benoit
6,589,007 B2 7/2003 Burton
6,655,899 B1 12/2003 Emerson
6,659,709 B1 * 12/2003 Anderson .............. E02F 3/962 37/403
6,718,661 B1 * 4/2004 Miller .................... E02F 3/962 37/395
6,742,291 B2 * 6/2004 Frigon ................... E02F 3/404 37/406
6,820,357 B1 * 11/2004 Menard ................. A01B 43/00 294/201
7,000,339 B1 * 2/2006 Ramun .................... B66C 3/04 294/86.29
7,014,412 B2 3/2006 Daniel
7,241,101 B2 7/2007 Bauer et al.
7,431,554 B2 10/2008 Westendorf et al.
7,566,197 B2 7/2009 Westendorf et al.
7,617,619 B2 11/2009 Cox
8,221,049 B1 7/2012 Westendorf et al.
8,449,241 B2 5/2013 Fritsch
8,506,018 B1 8/2013 Navarro
8,544,946 B2 10/2013 Holden
8,567,836 B2 10/2013 Lavalley et al.
8,919,017 B2 12/2014 Matsumoto
2003/0031547 A1 2/2003 Stumvoll et al.
2006/0000124 A1 * 1/2006 Nye ........................ E02F 3/965 37/403
2006/0051193 A1 3/2006 Westendorf et al.
2006/0272184 A1 * 12/2006 Underwood ........... E02F 3/425 37/403
2007/0107270 A1 5/2007 Edmond
2007/0180742 A1 * 8/2007 Kallevig ................ E02F 3/962 37/403
2008/0047171 A1 * 2/2008 Jalabert .................. E02F 3/962 37/403
2008/0181756 A1 * 7/2008 Moffitt ................... B66F 9/184 414/729
2009/0104012 A1 4/2009 Daniel
2009/0151204 A1 * 6/2009 Thomas ................... E02F 3/06 37/403
2009/0229433 A1 * 9/2009 Kovalenko .......... A01G 23/091 83/13
2009/0282710 A1 * 11/2009 Johnson ................ E02F 3/3677 37/406
2010/0083543 A1 * 4/2010 Staubli .................. E01C 23/088 37/348
2010/0170118 A1 * 7/2010 Thomas .................. E02F 3/384 37/403
2010/0206975 A1 * 8/2010 Ueda ........................ B02C 1/04 241/283
2010/0283275 A1 * 11/2010 Amelsfoort ............. E02F 3/246 294/106
2012/0282072 A1 11/2012 Sheppard
2012/0308340 A1 12/2012 Price
2013/0192098 A1 * 8/2013 Matsumoto ............. E02F 3/404 37/406
2014/0317967 A1 * 10/2014 Parker ..................... E02F 3/325 37/403
2015/0354166 A1 * 12/2015 Haveman ................ E02F 3/962 37/405

* cited by examiner

SKID LOADER ATTACHMENT INCLUDING A ROTATABLE AND EXTENDABLE CLAW

CROSS-REFERENCE TO RELATED APPLICATIONS

This application claims the benefit of Provisional Application No. 61/928,264, filed Jan. 16, 2014, entitled "SKID LOADER ATTACHMENT INCLUDING A ROTATABLE AND EXTENDABLE CLAW," which is incorporated herein by reference in its entirety.

TECHNICAL FIELD

The present invention relates generally to heavy equipment. More specifically, the present invention relates to a skid loader attachment including a rotatable and extendable claw.

BACKGROUND

Skid loaders are typically four-wheel vehicles with the wheels mechanically locked in synchronization on each side, and the left-side drive wheels can be driven independently of the right-side drive wheels. The wheels typically have no separate steering mechanism and hold a fixed straight alignment on the body of the machine. By turning the left and right wheel pairs at different speeds, the machine turns by skidding, or dragging its fixed-orientation wheels across the ground. The extremely rigid frame and strong wheel bearings prevent the torsional forces caused by this dragging motion from damaging the machine. The skid-steering vehicle is turned by generating differential velocity at the opposite sides of the vehicle.

The conventional bucket of some skid loaders can be replaced with a variety of specialized buckets or attachments that can be powered or controlled at least in part by the loader's hydraulic system.

SUMMARY

The present disclosure relates to an attachment for a skid loader. The attachment includes a base attachable to a loader arm of the skid loader, a rotatable coupling attached to the base on a side opposite the loader arm, and a claw portion attached to the rotatable coupling. The claw portion includes a stationary jaw and a pivoting jaw. The pivoting jaw pivotable with respect to the stationary jaw about a pivot rod. The pivoting jaw is coupled to the rotatable coupling via a hydraulic cylinder such that movement of the pivoting jaw about the pivoting rod is effected by actuation of the hydraulic cylinder. In some embodiments, the rotatable coupling is configured to rotate at least 180° with respect to the base. In some embodiments, the claw portion is extendable from the rotatable coupling in a direction perpendicular to the base. In some embodiments, the attachment further includes a spade extendable from the claw portion. The spade can be extendable from the stationary jaw of the claw portion. In some embodiments, the attachment further includes a jackhammer coupled to the claw portion. The jackhammer can be coupled to the pivoting jaw of the claw portion. In some embodiments, the attachment further includes a boom extending from the claw portion. The boom can be comprised of metal or wood, and can include a crane hook extendable from an end of the boom distal from the claw portion.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
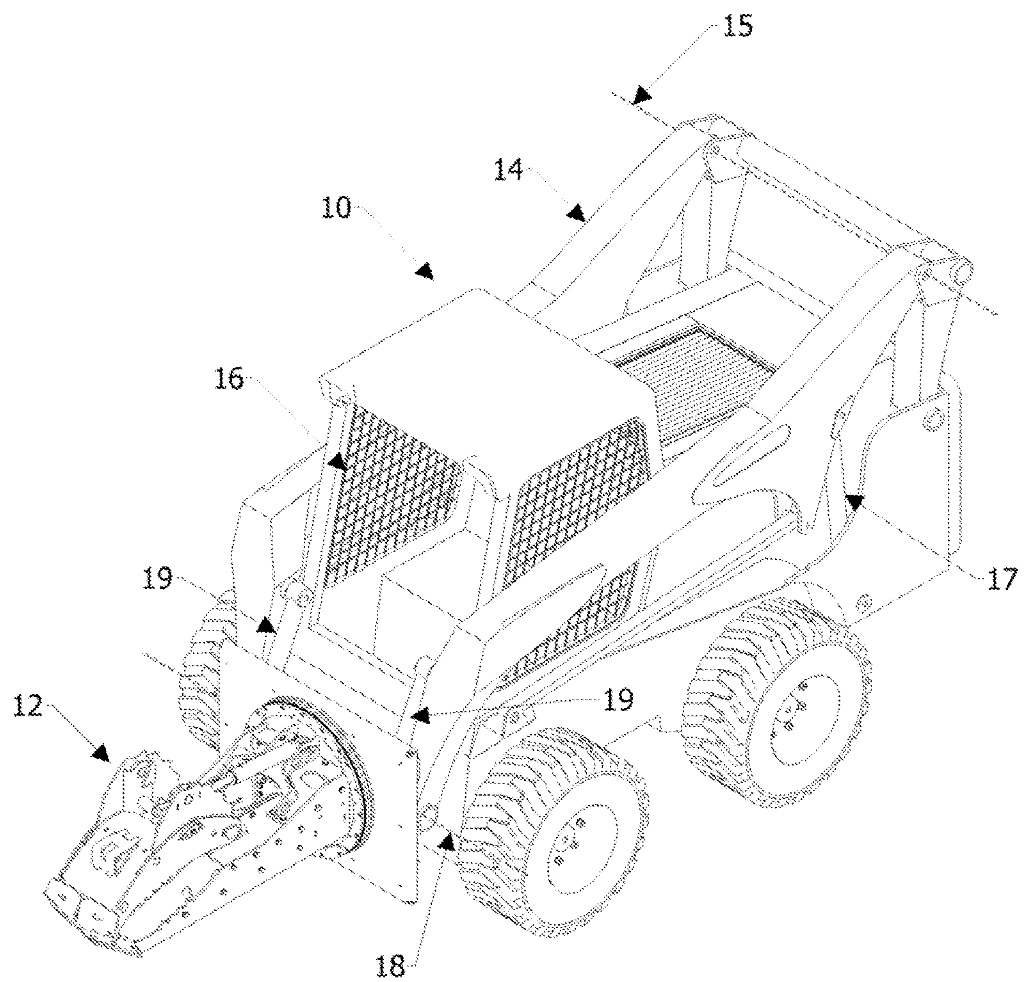
FIG. 1 is a perspective view of a skid loader including an extendable and rotatable claw attachment according to the present disclosure coupled to the loader arm.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a perspective view of a skid loader 10 including an attachment 12 according to the present disclosure. The attachment 12 and its components will be described in more detail with regard to subsequent figures. The skid loader 10 includes a loader arm 14, to which the attachment 12 is coupled. The loader arm 14 pivots about an axis 15 positioned behind a cab 16 of the skid loader 10. In alternative configurations, the loader arm 14 pivots about an axis positioned adjacent to or in front of the cab 16. Movement of the loader arm 14 is controlled with control system including devices or mechanisms (not shown) operated by an operator in the cab 16. In one exemplary implementation, the control system includes an electrohydraulic control system. In some embodiments, the skid loader 10 includes hydraulic cylinders 17 that are actuatable using the control mechanisms in the cab 16 to pivot the loader arm 14 about the axis 15. Pivoting the loader arm 14 with respect to the axis 15 moves the attachment 12 vertically (i.e., along an axis perpendicular to the ground).

The loader arm 14 also includes a second axis 18 near the attachment 12, about which the attachment 12 can pivot. Movement of this pivoting portion of the loader arm 14 is also controlled by an operator in the cab 16. In some embodiments, the skid loader 10 includes hydraulic cylinders 19 that are actuatable using the control mechanisms in the cab 16 to pivot the attachment about the axis 18.

The skid loader 10 shown in FIG. 1 is merely by way of example, and the skid loader 10 can be of any type or style adaptable to connect with and control the attachment 12. Example manufacturers of skid loaders 10 for use in conjunction with attachment 12 include, but are not limited to, Bobcat, Case, Caterpillar, Wacker Neuson, LiuGong, Volvo, John Deere, MG, JCB, New Holland, Gehl Company, Mustang, ASV, Komatsu, and Hyundai. Additionally, the size of the skid loader 10 is merely by way of example, and the attachment 12 (and attachable accessories) can be sized and configured for use with skid loaders or other machinery of any size.

FIGS. 2A-2D are perspective, side, top, and front views, respectively, of an embodiment of the attachment 12 according to the present disclosure in a home position. The attachment 12 includes a base 20, a rotatable coupling 22, and a claw portion 24. The base 20 is configured to attach to the loader arm 14 (FIG. 1) by conventional means. For example, the base 20 can be configured to attach to and detach from the loader arm 14 using controls in the cab 16, or the base 20 can be attached to the loader arm 14 manually.

Figure 2A:
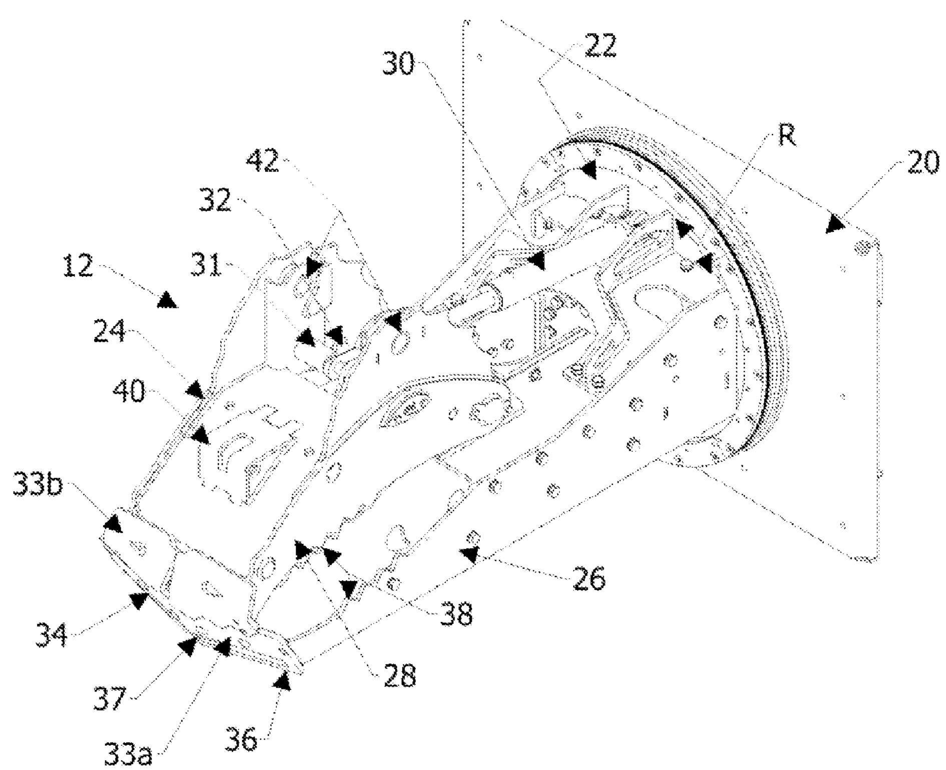
FIGS. 2A-2D are perspective, side, top, and front views, respectively, of an embodiment of the skid loader attachment according to the present disclosure in a home position.
Figure 2B:
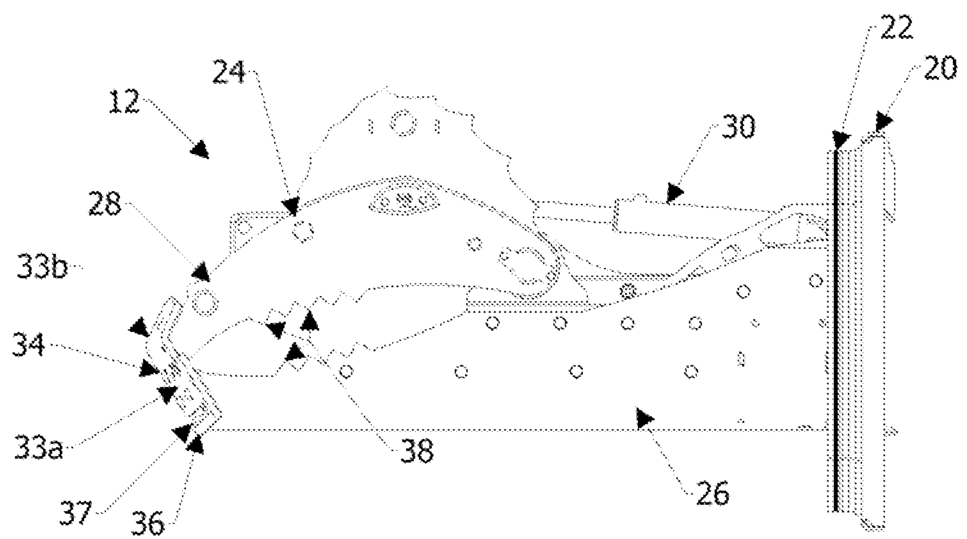
Figure 2C:
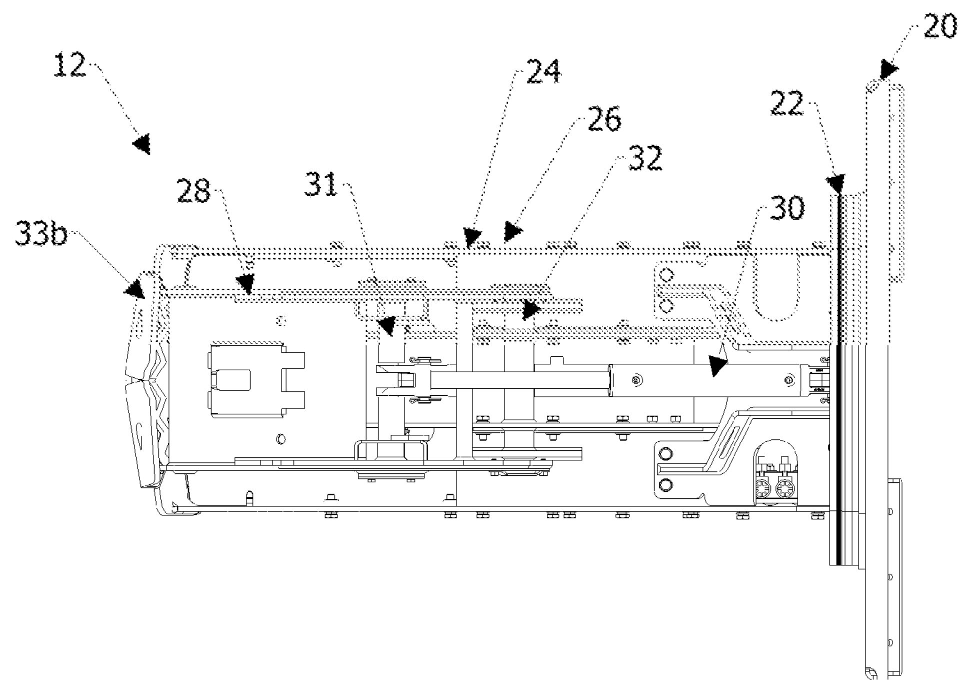
Figure 2D:
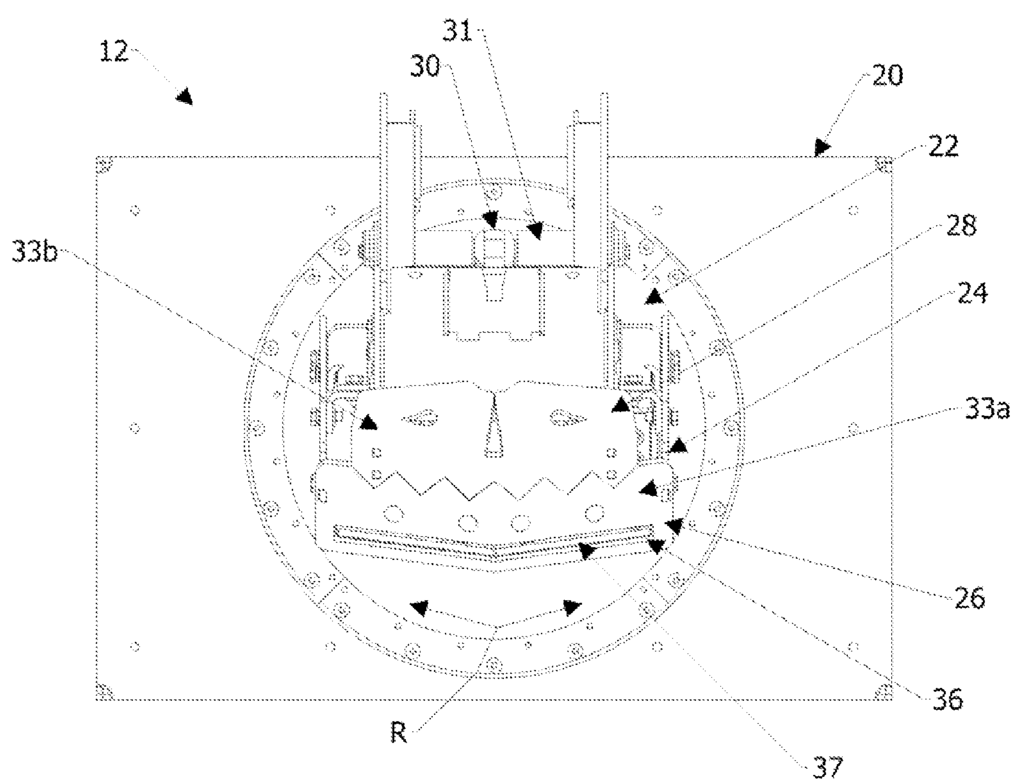

The rotatable coupling 22 is coupled to the base 20 on a side of the base 20 opposite the loader arm 14. The claw portion 24 is coupled to the rotatable coupling 22. The rotatable coupling 22 allows the claw portion 24 to be rotated with respect to an axis perpendicular to the base 20, as is shown by the arrows R (FIG. 2A). In some embodiments, the rotatable coupling 22 allows the claw portion 24 to rotate at least 180° with respect an axis perpendicular to the base 20. Rotation of the rotatable coupling 22 is controllable using control mechanisms within the cab 16.

The claw portion 24 includes a stationary jaw 26 and a pivoting jaw 28. For purposes of this description, the stationary jaw 26 is "stationary" relative to the pivoting jaw 28. In some embodiments, the stationary jaw 26 is connected directly to the rotatable coupling 22, and the pivoting jaw 28 is connected to the rotatable coupling 22 via a hydraulic cylinder 30. In other embodiments in which the claw portion 24 is extendable from the rotatable coupling 22 (as will be described in more detail below), the jaws 26, 28 are coupled to the extendable portion of the attachment 12. The hydraulic cylinder 30 is controllable with control mechanisms in the cab 16. The hydraulic cylinder 30 is coupled to a coupling rod 31, which allows the pivoting jaw 28 to move relative to the stationary jaw 26 by actuating the hydraulic cylinder 30. As will be described in more detail below, the pivoting jaw 28 is configured to pivot about a pivot rod 32 when the hydraulic cylinder 30 is actuated. In the embodiment shown (particularly in FIGS. 2A, 2C, and 2D), the width of the pivoting jaw 28 (in a direction parallel to the pivot rod 32) is less than the width of the stationary jaw 26. In alternative embodiments, the widths of the pivoting jaw 28 and stationary jaw 26 are substantially the same, or the width of the pivoting jaw 28 is greater than the width of the stationary jaw 26. In some alternative embodiments, both jaws 26 and 28 are configured to pivot or otherwise move.

The jaws 26, 28 can include front plates 33*a* and 33*b*, respectively, that each have teeth configured to grab, grip, or hold objects disposed between the jaws 26, 28. In the embodiment shown, the front plate 33*a* includes a slot 36 through which a spade 37 can extend. The extension and use of spade 37 will be described in more detail below. In some embodiments, the stationary jaw 26 and/or pivoting jaw 28 include a plurality of teeth 34 along sidewalls of the jaws 26, 28. The teeth 34 facilitate holding or gripping of large objects disposed between the jaws 26, 28.

In some embodiments, the claw portion 24 also includes an accessory coupling 40 and an accessory mount 42. As will be described in more detail herein, the attachment 12 can be configured to allow for attachment of an accessory to the accessory coupling 40 and accessory mount 42. When attached to the claw portion 24, the accessory can be controlled by the operator of the skid loader 10 using controls within the cab 12. For example, in addition to operating the accessory from the cab 12 (as will be described in more detail below), the operator can also move the accessory into position for use by moving the loader arms 14 to lift the attachment 12, rotating the attachment 12 about the axis 18, and/or rotating the claw portion 24 of the attachment 12 at the rotatable coupling. The accessory can have various forms and functions. Example accessories can include, but are not limited to, a jackhammer, a chainsaw, a boom and crane, and so on. Embodiments of attachment 12 with each of these exemplary accessories are described in greater detail below.

Figure 3:
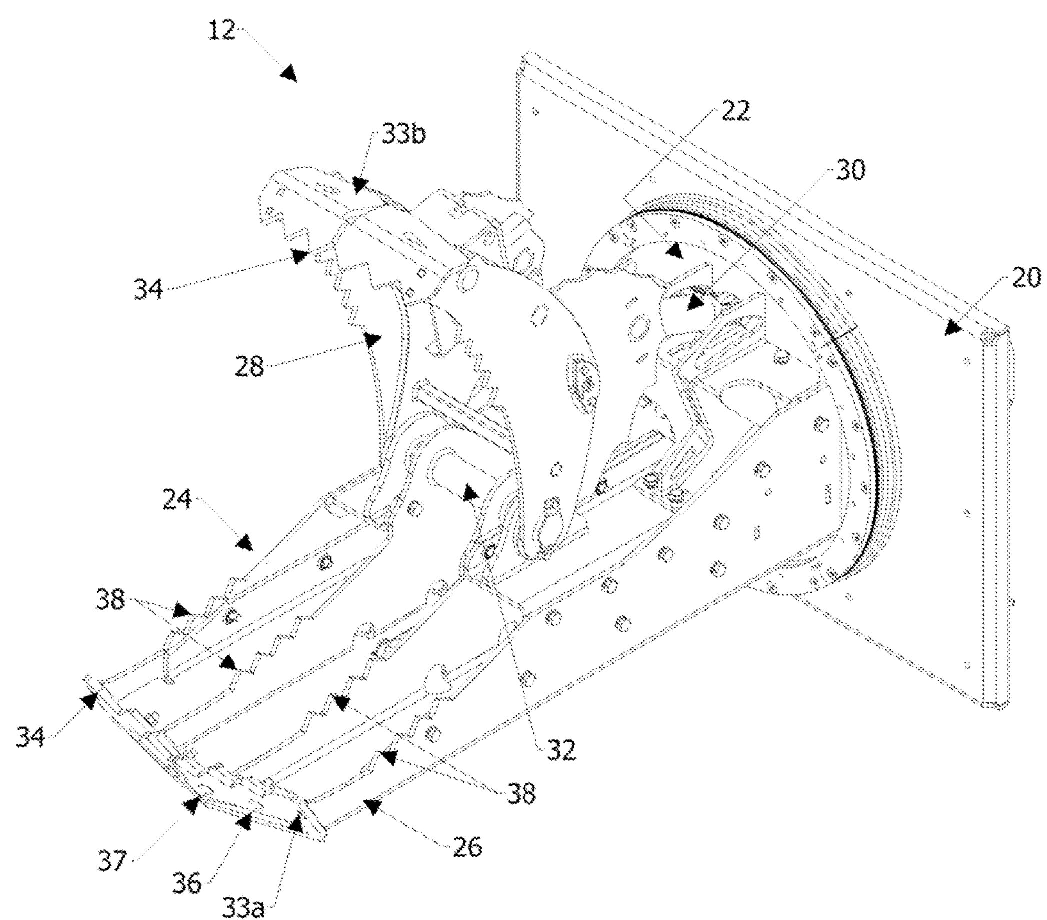
FIG. 3 is a perspective view of the skid loader attachment according to the present disclosure with the claw portion in an open position.

FIG. 3 is a perspective view of the skid loader attachment 12 according to the present disclosure with the claw portion 24 in an open position. In the open position, the hydraulic cylinder 30 is retracted, which causes the pivoting jaw 28 to rotate about the pivoting rod 32 away from the stationary jaw 26. In some embodiments, the claw portion 24 is controllable to open to any position between the closed position shown in FIGS. 2A-2C and the open position of FIG. 3. In some embodiments, the hydraulic cylinder 30 and pivoting jaw 28 is configured such that the pivoting jaw 28 rotates around the pivot bar 32 from the closed position shown in FIGS. 2A-2D by a maximum of about 90°, as shown in FIG. 3. In other embodiments, the hydraulic cylinder 30 and pivoting jaw 28 can be configured such that the pivoting jaw 28 rotates around the pivot bar 32 by maximum of greater than about 90° or less than about 90°. Opening the claw portion 24 to the open position allows large objects, such as rocks, trees, branches, etc., to be positioned between the jaws 26, 28. When the large object(s) are positioned between the jaws 26, 28, the hydraulic cylinder 30 can be extended to close the jaws 26, 28 around the object(s) to hold the object(s) between the jaws 26, 28. When the jaws 26, 28 are closed, the teeth 34 and/or 38 are urged against the object(s) between the jaws 26, 28 to grasp the object(s) with the claw portion 24.

Figure 4:
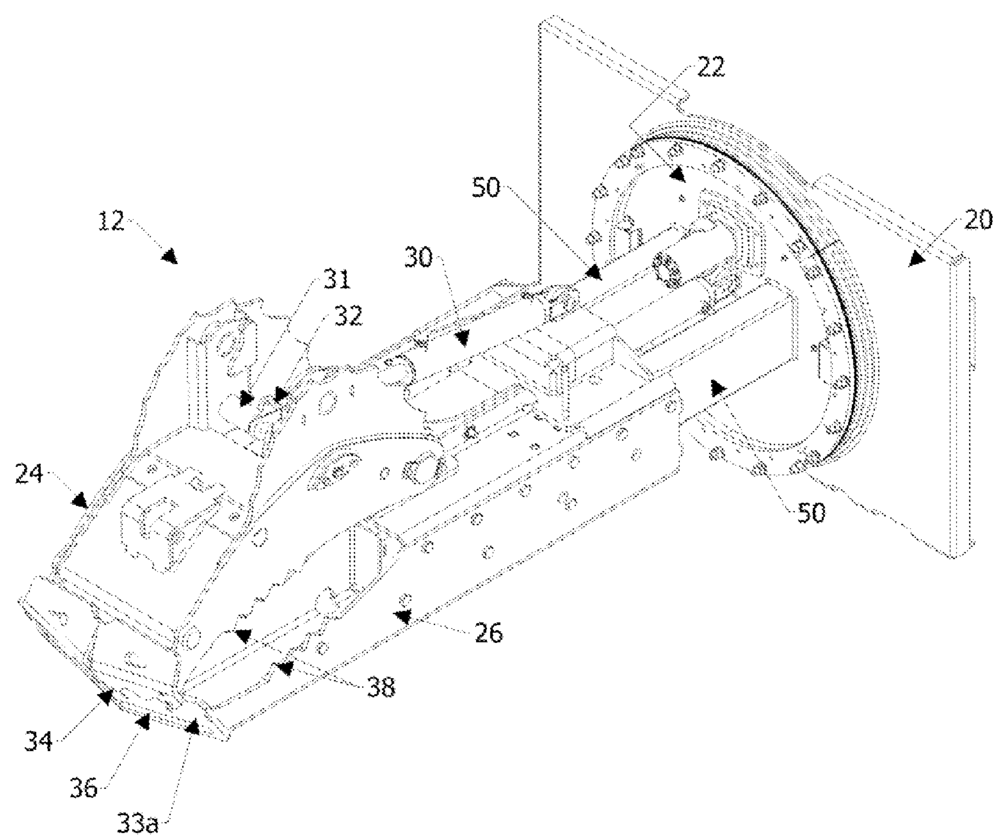
FIG. 4 is a perspective view of the skid loader attachment according to the present disclosure with the claw portion in the open position and extended from the attachment base.

FIG. 4 is a perspective view of the skid loader attachment 12 according to the present disclosure with the claw portion 24 in the closed position and extended from the attachment base 20. In the embodiment shown, the claw portion 24 extends from the base 20 along tracks 50 extending within the claw portion 24. In some embodiments, the claw portion

24 is extended from the attachment base 20 by extending hydraulic cylinders (not shown) using controls within the cab 16. Extending the claw portion 24 from the attachment base 20 can have many uses, including allowing scooping or moving of objects in front of the claw portion 24 without having to move the entire skid loader 10 forward, or extending the reach of an accessory attached to the claw portion 24.

Figure 5:
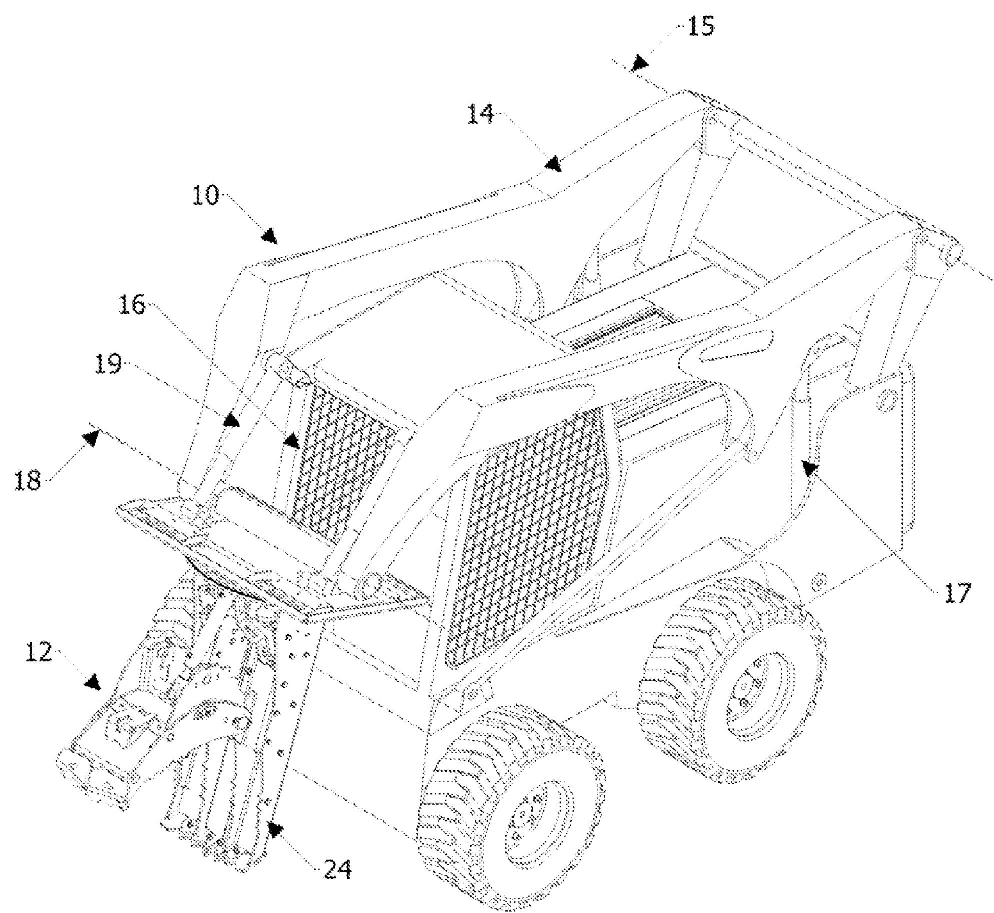
FIG. 5 is a perspective view of a skid loader including the skid loader attachment with the claw portion in the open position.

FIG. 5 is a perspective view of a skid loader 10 including the skid loader attachment 12 with the claw portion 24 in the open position. The claw portion 24 is also in the home position in that the claw portion is not rotated with respect to the base of the attachment 12. The hydraulic cylinders 17 are extended to raise the loader arms 14 of the skid loader 10 such that the attachment 12 is elevated from the ground. Additionally, the hydraulic cylinders 19 are extended such that attachment 12 is rotated about the axis 18. In this configuration, the open end of the claw portion 24 is directed toward the ground. In this position, the claw portion 24 can be positioned over an object on the ground, and the claw portion 24 can then be closed around the object to lift the object, move the object, etc. As FIG. 5 illustrates, the attachment 12 can be moved to a desired height above the ground and angle relative to the ground by adjusting the position of the hydraulic cylinders 17 and 19, respectively.

Figure 6:
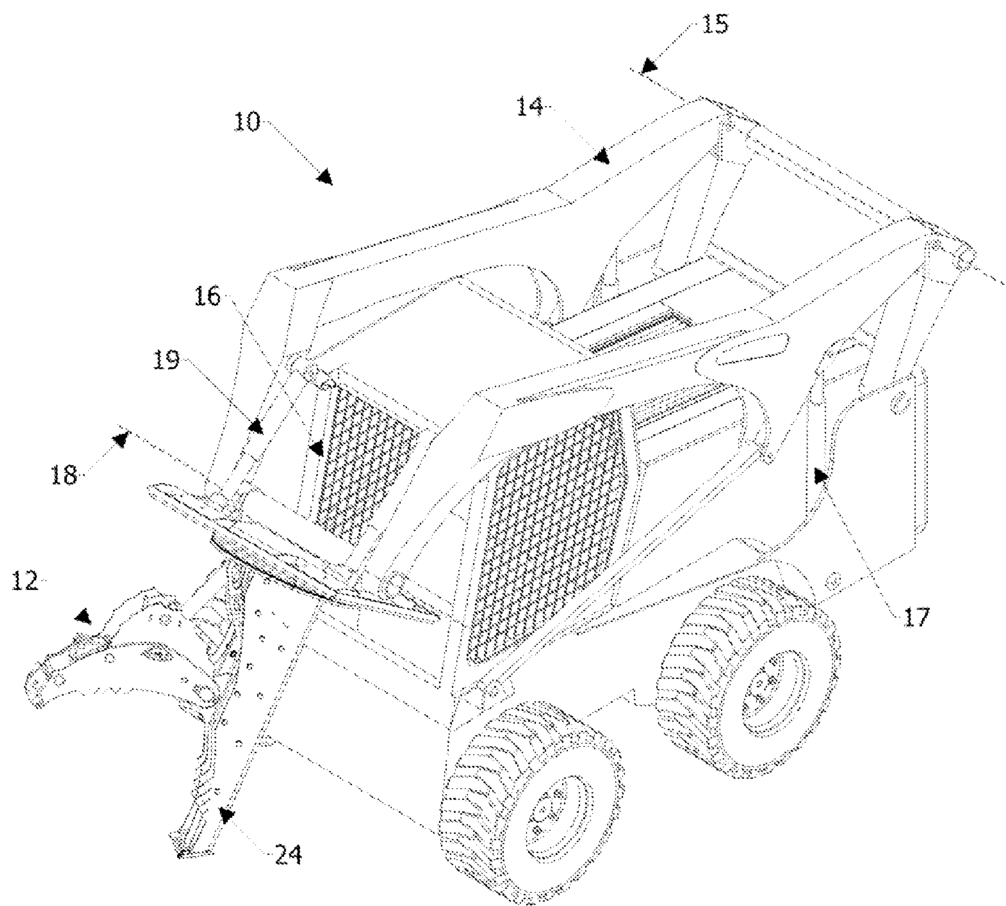
FIG. 6 is a perspective view of a skid loader including the skid loader attachment with the claw portion in the open position and rotated about 45° relative to the home position.
Figure 7:
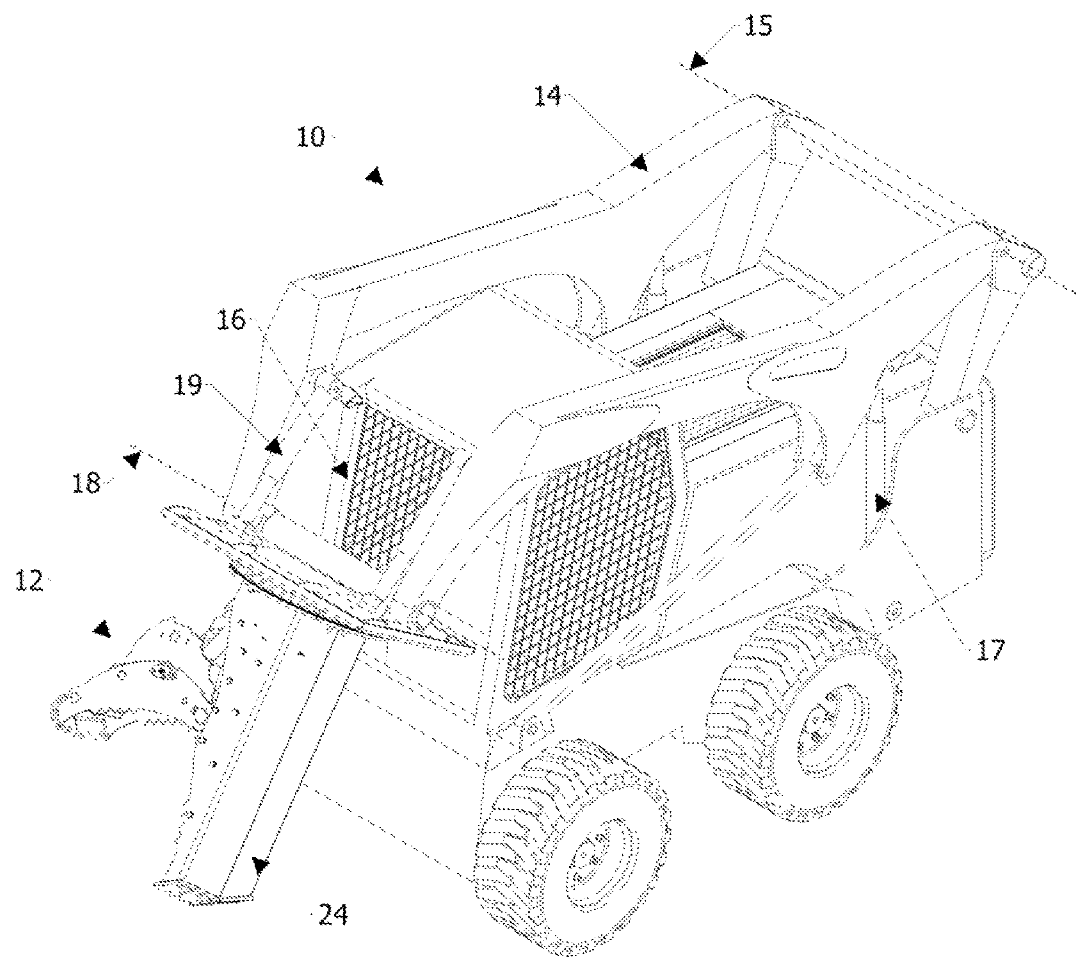
FIG. 7 is a perspective view of a skid loader including the skid loader attachment with the claw portion in the open position and rotated about 90° relative to the home position.

FIGS. 6 and 7 are perspective views of a skid loader 10 including the skid loader attachment 12 with the claw portion 24 in the open position, and the attachment 12 positioned similarly to the attachment 12 of FIG. 5. However, in this embodiment, the claw portion 24 is rotated about 45° (FIG. 6) and 90° (FIG. 7) relative to the home position. The angle of claw portion 24 relative to the home position illustrated in FIGS. 6 and 7 are merely by way of example. The claw portion 24 can be rotated relative to the home position by up to 180°. Rotating the claw portion 24 allows the operator to position the claw portion 24 relative to an object on the ground as necessary to best clamp the claw portion 24 around the object without having to move the skid loader 10 relative to the object.

Figure 8:
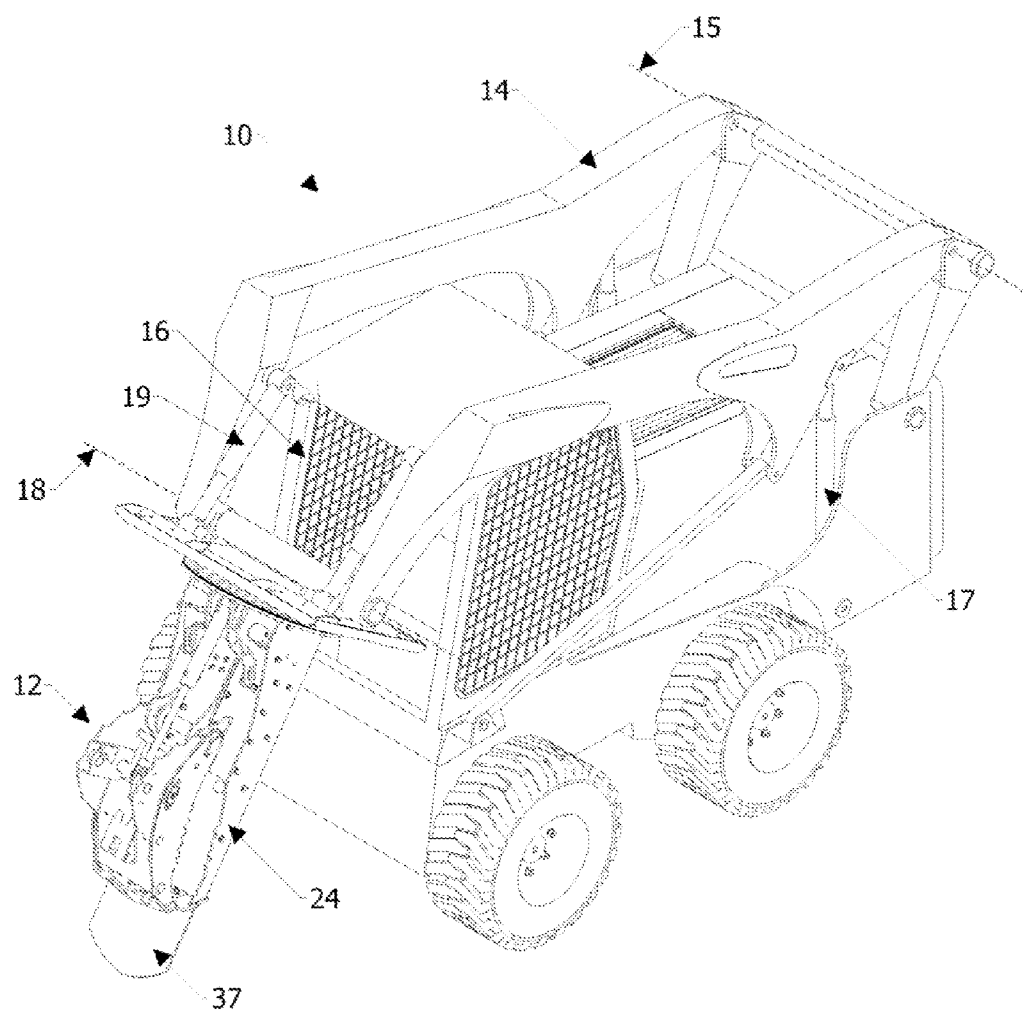
FIG. 8 is a perspective view of a skid loader including the skid loader attachment according to the present disclosure with a spade extended from the claw portion.

FIG. 8 is a perspective view of a skid loader 10 including the skid loader attachment 12 according to the present disclosure with the spade 37 extended from the claw portion 24. As discussed above, the spade 37 is extendable through the slot 36 in the front plate 33*a* on the stationary jaw 26 of the claw portion 24. The movement of the spade 37 is controlled from within the cab 16 by an operator. As is shown, the hydraulic cylinders 17 are extended to raise the loader arms 14 of the skid loader 10 such that the attachment 12 is elevated from the ground. Additionally, the hydraulic cylinders 19 are extended such that attachment 12 is rotated about the axis 18. In this configuration, the spade 37 is directed toward the ground. The spade 37 can be used, for example, to dig, scoop, or scrape the ground or objects. The claw portion 24 of the attachment can also be rotated (i.e., by rotating the rotatable coupling 22) while the spade 37 is in contact with the ground to drill the spade 37 into the ground.

Figure 9:
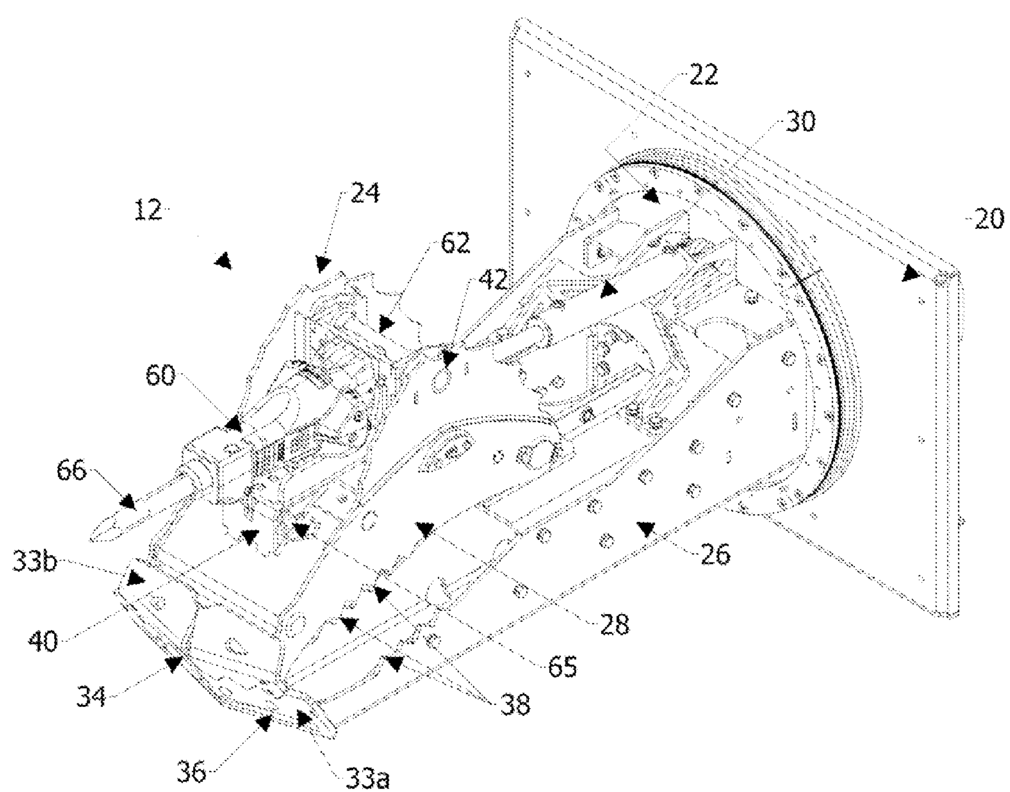
FIG. 9 is a perspective view of the skid loader attachment according to the present disclosure including a jackhammer accessory attached to the claw portion.

FIG. 9 is a perspective view of the skid loader attachment 12 according to the present disclosure including a jackhammer 60 attached to the claw portion 24. The jackhammer 60 includes a connecting bar 62 and a base plate 64 for securing the jackhammer 60 to the claw portion 22. The jackhammer 60 is secured to the claw portion 22 by coupling the connecting bar 62 on the jackhammer 60 to the accessory mounts 42 on the claw portion 24. In some embodiments, the connecting bar 62 interlocks with the accessory mounts 42, or the connecting bar 62 and accessory mounts 42 are linked together with another mechanical device (e.g., lock pin).

The base plate 64 of the jackhammer 60 is also secured to the accessory coupling 40 on the claw portion 24. The base plate 64 includes a tongue (not shown) that extends through a slot on the accessory coupling 40. A lock pin 65 can be inserted through holes in the accessory coupling 40 and base plate 64 to secure the jackhammer 60 to the claw portion 24.

The jackhammer 60 includes a bit 66 that extends from a distal end of the jackhammer 60. The jackhammer 60 is positioned on the claw portion 24 such that the bit 66 extends beyond the plates 33*a* and 33*b* at a distal end of the claw portion 24. Thus, the attachment 12 can be positioned with respect to an object to be such that the bit 66 extends beyond the front end of the claw portion 24 to allow the bit 66 to contact the object.

The jackhammer 60 can include controls at an end of the jackhammer 60 proximate the connecting bar 62 that are configured to interface with controls on the skid loader 10. For example, the skid loader 10 can include connections to the skid loader control system that extend to the area of the claw portion 24 near the accessory mounts 42 for connection to the jackhammer 60.

Figure 10:
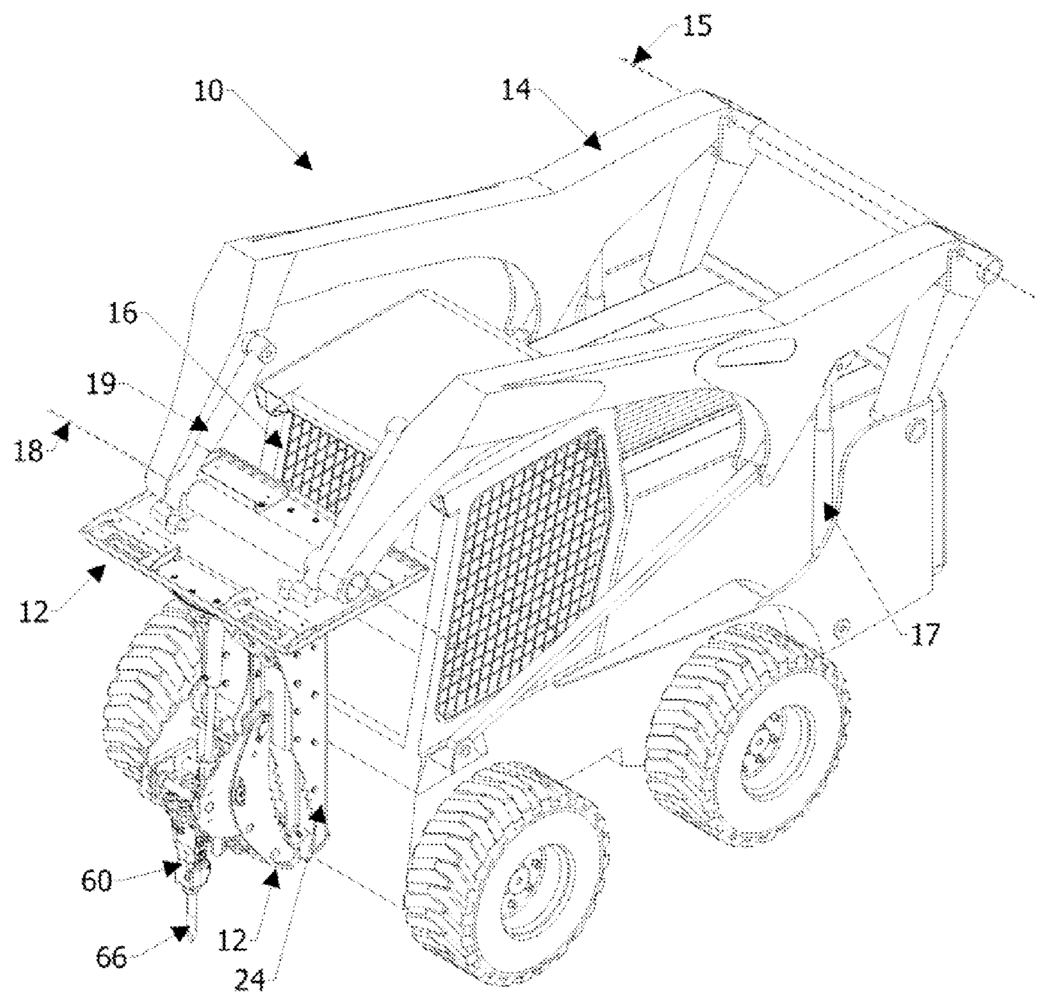
FIG. 10 is a perspective view of a skid loader with the embodiment of the skid loader attachment shown in FIG. 9 with the jackhammer directed toward the ground.

FIG. 10 is a perspective view of a skid loader 10 including the skid loader attachment 12 shown in FIG. 9 with the jackhammer 60 directed toward the ground. As is shown, the hydraulic cylinders 17 are extended to raise the loader arms 14 of the skid loader 10 such that the attachment 12 is elevated from the ground. Additionally, the hydraulic cylinders 19 are extended such that attachment 12 is rotated about the axis 18. In this configuration, the base 20 is disposed substantially parallel to the ground, and the bit 66 of the jackhammer 60 is directed toward the ground. The jackhammer 60 can be operated by a user in the cab 16 using controls within the cab 16 to activate and deactivate the jackhammer 60. The jackhammer 60 can be used, for example, to break apart objects into smaller objects for easier grabbing and lifting with the claw portion 24. The jackhammer 60 can also be used in other types of demolition.

Figure 11:
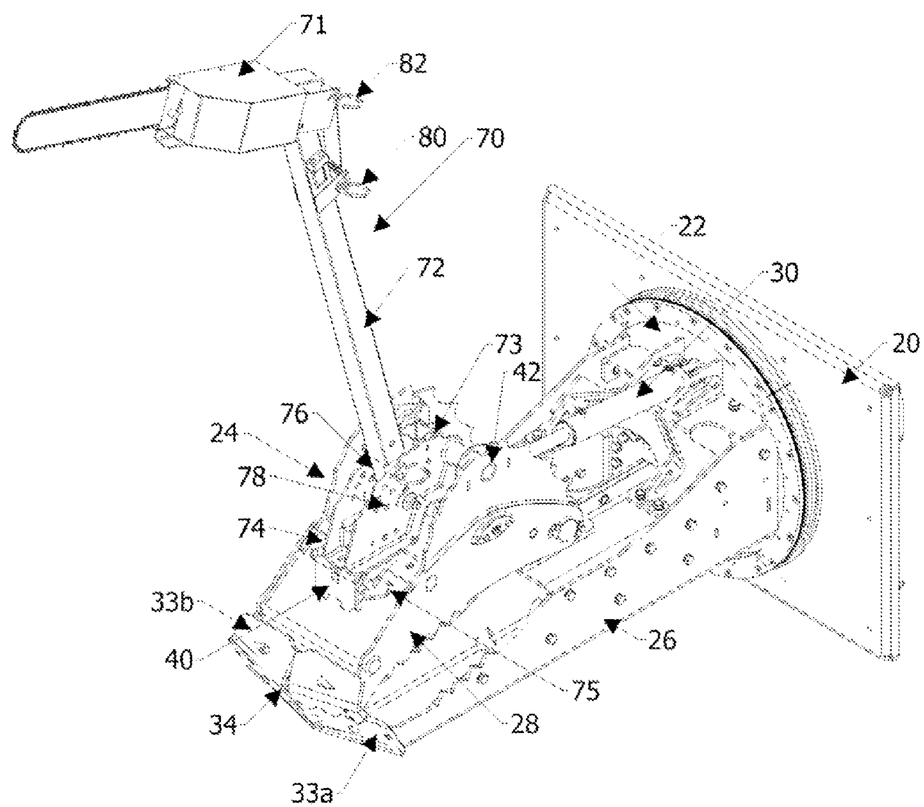
FIG. 11 is a perspective view of the skid loader attachment according to the present disclosure including a chainsaw accessory attached to the claw portion.

FIG. 11 is a perspective view of the skid loader attachment 12 according to the present disclosure including a chainsaw assembly 70 attached to the claw portion 24. The chainsaw assembly 70 includes a chainsaw 71 and chainsaw boom 72. The chainsaw assembly 70 also includes a connecting bar 73 and a base 74 for securing the chainsaw assembly 70 to the claw portion 22. The chainsaw assembly 70 is secured to the claw portion 22 by coupling the connecting bar 73 on the chainsaw assembly 70 to the accessory mounts 42 on the claw portion 24. In some embodiments, the connecting bar 73 interlocks with the accessory mounts 42, or the connecting bar 73 and accessory mounts 42 are linked together with another mechanical device (e.g., lock pin).

The base 74 of the chainsaw assembly 70 is also secured to the accessory coupling 40 on the claw portion 24. The base 74 includes a tongue (not shown) that extends through a slot on the accessory coupling 40. A lock pin 75 can be inserted through holes in the accessory coupling 40 and base 74 to secure the chainsaw assembly 70 to the claw portion 24.

The base 74 also includes a lock pin 76 that is into one of a plurality of boom adjuster holes 78 in the base 74. When the lock pin 76 is removed from the base 74, the boom 72 can be rotated with respect to the base 74 such that the angle of the boom 72 with respect to the base 20 changes. When the desired angle of the boom 72 is set, the lock pin 76 can be inserted into the appropriate boom adjuster holes 78 to hold the boom 72 at the desired angle.

At a distal end of the boom 72, lock pins 80 and 82 secure the chainsaw 71 to the chainsaw assembly 70. In some embodiments, the lock pins 80 and 82 couple the chainsaw 71 to a mechanism (not shown) controllable from the cab 16 of the skid loader 10 that allows the angle of the chainsaw 71 relative to the boom 72 to be adjusted.

The chainsaw assembly 70 can include controls at an end of the chainsaw assembly 70 proximate the connecting bar 73 that are configured to interface with controls on the skid loader 10. For example, the skid loader 10 can include connections to the skid loader control system that extend to the area of the claw portion 24 near the accessory mounts 42 for connection to the jackhammer 60. The controls allow the operator of the skid loader 10 to activate and deactivate the chainsaw 71 from the cab 16.

Figure 12:
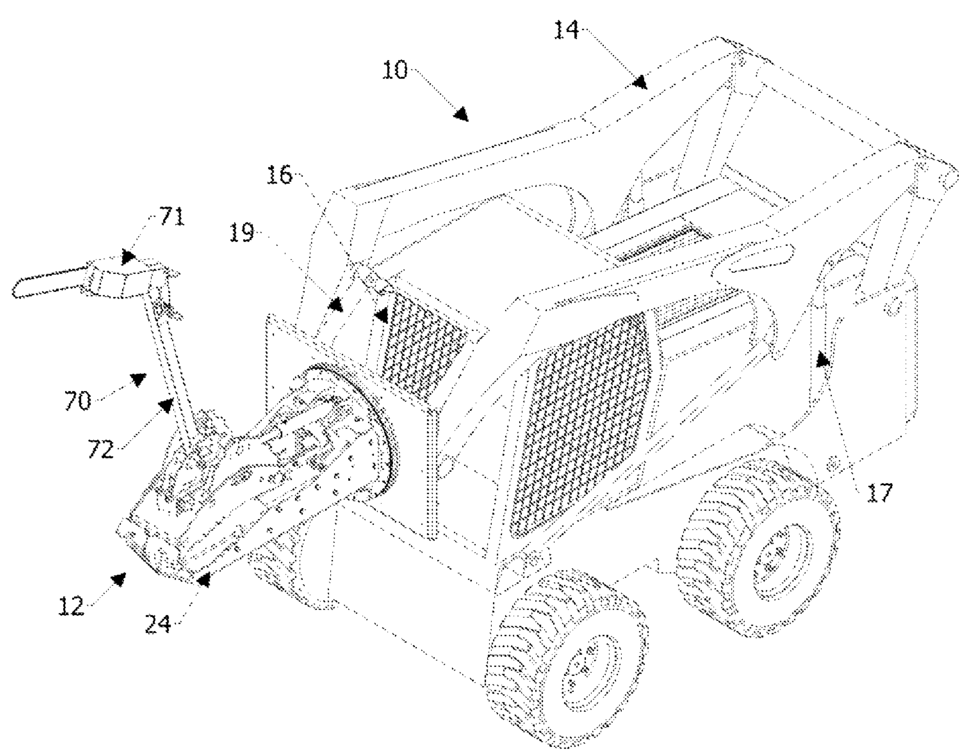
FIG. 12 is a perspective view of a skid loader with the embodiment of the skid loader attachment shown in FIG. 11.

FIG. 12 is a perspective view of a skid loader 10 including the skid loader attachment 12 shown in FIG. 11. As is shown, the hydraulic cylinders 17 are extended to raise the loader arms 14 of the skid loader 10 such that the attachment 12 is elevated from the ground. Additionally, the hydraulic cylinders 19 are retracted such that attachment 12 is rotated about the axis 18 so that the claw portion 24 extends away from the cab 16. In this configuration, the base 20 is disposed substantially perpendicular to the ground, and the chain portion of the chainsaw 71 extends away from the cab 16. The angle of the chainsaw 71 with respect to an object can be altered by actuating hydraulic cylinders 17 and/or 18, and/or rotating the claw portion 24 with respect to the base 20. Additionally, the angle of the chainsaw 71 and boom 72 with respect to each other and the base 20 can be varied as described above. The chainsaw 71 can be operated by a user in the cab 16 using controls within the cab 16 to activate and deactivate the chainsaw 71. The chainsaw 71 can be used, for example, to cut trees or other objects.

Figure 13:
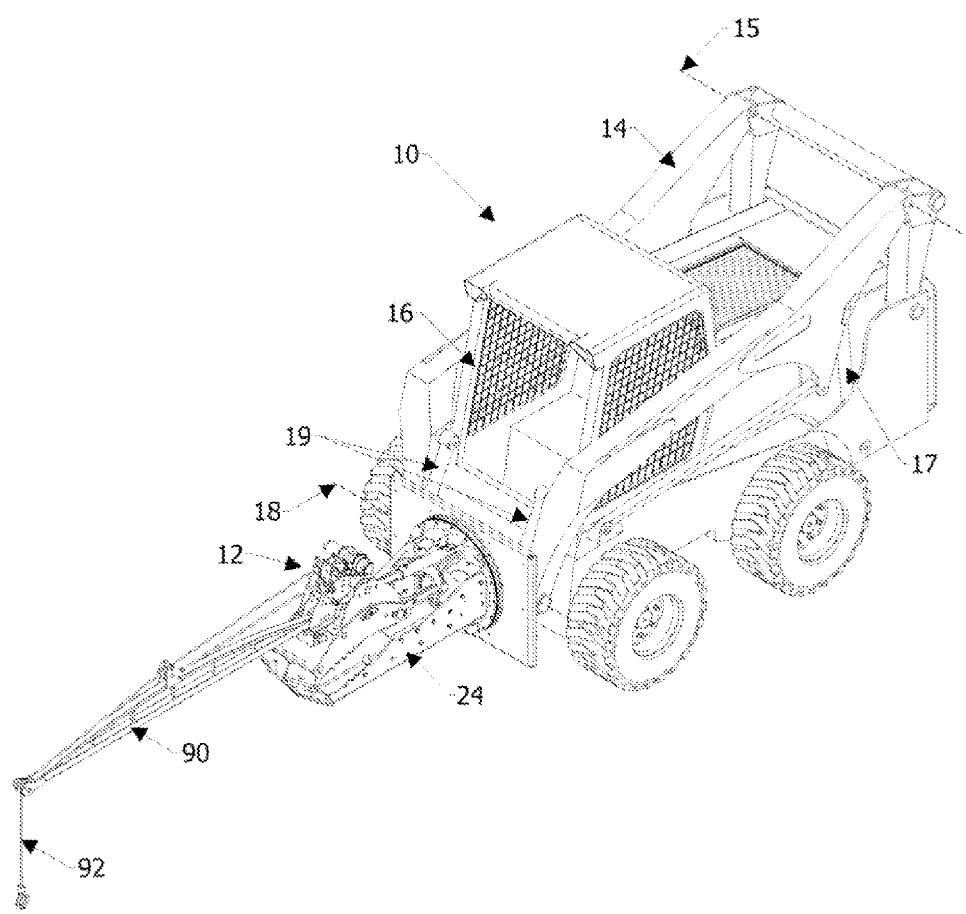
FIG. 13 is a perspective view of a skid loader including the skid loader attachment according to the present disclosure with a boom and crane extending from the claw portion.

FIG. 13 is a perspective view of a skid loader 10 with a further embodiment of the skid loader attachment 12 according to the present disclosure with a boom 90 extending from the claw portion 24. The boom 90 may be inserted into a slot (not shown) within the claw portion 24 to hold the boom 90 in place, or the boom 90 may be held between the jaws 26, 28 of the claw portion 24. In some embodiments, the boom 90 is comprised of metal or wood. In some embodiments, the boom 90 further includes a crane hook 92 at the distal end of the boom 90. The crane hook 92 may be configured to be extended and retracted from the distal end of the boom 90 (e.g., using controls within the cab 16). The boom 90 can be lifted vertically by extending the hydraulic cylinders 17. In this way, items attachable to the boom 64 or coupled to the crane hook 92 can be carried with the attachment 12.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

I claim:

1. An attachment for a skid loader, the attachment comprising:

a base configured to couple to a loader arm of a skid loader, the loader arm configured to pivot about a loader arm axis;

a rotatable coupling attached to the base on a side opposite the loader arm and configured to rotate about a first axis; and a claw portion attached to the rotatable coupling and extendable from the rotatable coupling in a direction perpendicular to the base along tracks within a stationary jaw of the claw portion, the claw portion including the stationary jaw and a pivoting jaw, the pivoting jaw pivotable with respect to the stationary jaw about a pivot rod defining a second axis perpendicular to the first axis, the pivoting rod coupling the pivoting jaw to the stationary jaw, wherein the pivoting jaw is coupled to the rotatable coupling via a hydraulic cylinder such that movement of the pivoting jaw about the pivoting rod is effected by actuation of the hydraulic cylinder.

2. The attachment of claim 1, wherein the rotatable coupling is configured to rotate at least 180° with respect to the base.

3. The attachment of claim 1, and further comprising a spade extendable from the claw portion.

4. The attachment of claim 3, wherein the spade is extendable from the stationary jaw of the claw portion.

5. The attachment of claim 1, and further comprising:

an accessory coupling assembly on the pivoting jaw of the claw portion, the accessory coupling assembly configured to mount an accessory on the claw portion of the attachment.

6. The attachment of claim 5, and further comprising a jackhammer coupled to the accessory coupling assembly.

7. The attachment of claim 5, and further comprising a chainsaw assembly coupled to the accessory coupling assembly.

8. The attachment of claim 7, wherein the chainsaw assembly comprises: a base coupled to the accessory coupling assembly;

a boom extending from the base; and a chainsaw coupled to an end of the boom opposite the base, wherein the angle of the chainsaw is adjustable relative to the boom.

9. The attachment of claim 8, wherein an angle of the boom relative to the base is adjustable.

10. The attachment of claim 1, and further comprising a boom extending from the claw portion, wherein the boom includes a crane hook extendable from an end of the boom distal from the claw portion.

11. An attachment of a skid loader, the attachment comprising:

a base configured to releasably attach to a loader arm of the skid loader;

a rotatable coupling attached to the base on a side opposite the loader arm, the loader arm configured to pivot about a loader arm axis;

a claw portion attached to the rotatable coupling and configured to pivot about a first axis defined by the rotatable coupling, the claw portion including a stationary jaw and a pivoting jaw coupled to the stationary jaw by a pivot rod defining a second axis perpendicular to the first axis, the pivoting jaw pivotable with respect to the stationary jaw about the pivot rod;

a hydraulic cylinder coupled between the pivoting jaw and the rotatable coupling and configured to cause the pivoting jaw to pivot about the second axis;

an accessory coupling assembly coupled to the claw portion; and an accessory coupled to the claw portion by the accessory coupling assembly, the accessory comprising a tool including one or more mechanically actuatable elements.

12. The attachment of claim 11, and wherein the accessory coupling assembly is coupled to the pivoting jaw of the claw portion, the accessory coupling assembly configured to mount the accessory on the pivoting jaw of the claw portion of the attachment.

13. The attachment of claim 11, wherein the accessory comprises at least one of a jackhammer, a chainsaw assembly, and a boom with a crane.

14. The attachment of claim 11, wherein the accessory comprises a chainsaw assembly including:

a base coupled to the accessory coupling assembly;

a chainsaw boom extending from the base; and a chainsaw coupled to an end of the chainsaw boom opposite the base, wherein the angle of the chainsaw is adjustable relative to the chainsaw boom.

15. The attachment of claim 11, wherein the rotatable coupling is configured to rotate at least 180° with respect to the base.

16. The attachment of claim 11, and further comprising a spade extendable from the claw portion.

17. The attachment of claim 16, wherein the spade is extendable from the stationary jaw of the claw portion.

18. An attachment of a skid loader, the attachment comprising:

a base configured to couple to a loader arm of a skid loader, the loader arm configured to pivot about a loader arm axis;

a rotatable coupling attached to the base on a side opposite the loader arm and configured to rotate about a first axis; and a claw device coupled to the rotatable coupling, the claw device comprising:

a first jaw portion;

a second jaw portion coupled to the first jaw portion by a pivoting rod, the second jaw portion configured to pivot about the pivoting rod relative to the first jaw portion, the pivoting rod defining a second axis that is perpendicular to the first axis;

a hydraulic element configured to pivot the second jaw portion; and an extendable portion coupled between the rotatable coupling and the first and second jaw portions, the extendable portion configured to extend in a direction perpendicular to the base to selectively move the first and second jaw portions away from or closer to the base.

* * * * *